US009698418B2

United States Patent
Paulsen et al.

(10) Patent No.: US 9,698,418 B2
(45) Date of Patent: Jul. 4, 2017

(54) HIGH NICKEL CATHODE MATERIAL HAVING LOW SOLUBLE BASE CONTENT

(75) Inventors: Jens Paulsen, Dae-jeon (KR); JiHye Kim, Cheon an (KR)

(73) Assignee: Umicore, Brussels (BE)

( * ) Notice: Subject to any disclaimer, the term of this patent is extended or adjusted under 35 U.S.C. 154(b) by 816 days.

(21) Appl. No.: 13/983,596

(22) PCT Filed: Jan. 31, 2012

(86) PCT No.: PCT/EP2012/051492
§ 371 (c)(1),
(2), (4) Date: Oct. 22, 2013

(87) PCT Pub. No.: WO2012/107313
PCT Pub. Date: Aug. 16, 2012

(65) Prior Publication Data
US 2014/0054495 A1   Feb. 27, 2014

Related U.S. Application Data

(60) Provisional application No. 61/457,250, filed on Feb. 10, 2011.

(30) Foreign Application Priority Data

Feb. 7, 2011   (EP) ..................... 11000945

(51) Int. Cl.
| | | |
|---|---|---|
| *H01M 4/505* | (2010.01) | |
| *H01M 4/525* | (2010.01) | |
| *C01G 53/00* | (2006.01) | |
| *C01D 15/02* | (2006.01) | |
| H01M 10/052 | (2010.01) | |
| H01M 10/52 | (2006.01) | |

(52) U.S. Cl.
CPC ............ *H01M 4/505* (2013.01); *C01D 15/02* (2013.01); *C01G 53/50* (2013.01); *H01M 4/525* (2013.01); *C01P 2002/54* (2013.01); *C01P 2006/12* (2013.01); *H01M 10/052* (2013.01); *H01M 10/52* (2013.01)

(58) Field of Classification Search
CPC ...................................... H01M 4/505
USPC ..................................... 252/182.1
See application file for complete search history.

(56) References Cited

U.S. PATENT DOCUMENTS

| | | | | |
|---|---|---|---|---|
| 5,264,201 A | * | 11/1993 | Dahn .................... | H01M 4/485 252/519.1 |
| 7,648,693 B2 | | 1/2010 | Paulsen et al. | |
| 2004/0072072 A1 | * | 4/2004 | Suzuki ............... | C01G 45/1221 429/231.1 |
| 2004/0191161 A1 | | 9/2004 | Wang et al. | |
| 2004/0234854 A1 | * | 11/2004 | Kang .................... | H01M 4/505 429/231.1 |
| 2005/0220701 A1 | * | 10/2005 | Suhara .................. | C01G 51/42 423/594.6 |
| 2006/0068289 A1 | * | 3/2006 | Paulsen ................. | C01G 51/42 429/231.1 |
| 2006/0233696 A1 | * | 10/2006 | Paulsen ................ | C01G 53/006 423/594.4 |
| 2010/0112447 A1 | * | 5/2010 | Yamamoto ............ | H01M 4/525 429/223 |
| 2011/0193013 A1 | * | 8/2011 | Paulsen ................. | B82Y 30/00 252/182.1 |
| 2011/0260099 A1 | * | 10/2011 | Paulsen ................ | C01G 53/006 252/182.1 |
| 2013/0209885 A1 | * | 8/2013 | Paulsen ................. | B82Y 30/00 429/223 |
| 2014/0054495 A1 | * | 2/2014 | Paulsen ................. | C01G 53/50 252/182.1 |

FOREIGN PATENT DOCUMENTS

| | | |
|---|---|---|
| CN | 1498432 A | 5/2004 |
| CN | 101803073 | 8/2010 |
| JP | 2004346970 | 12/2004 |
| JP | 2007-063033 A | 3/2007 |
| WO | WO 2009/021651 | 2/2009 |

OTHER PUBLICATIONS

International Search Report dated May 16, 2012 for PCT/EP2012/051492, filed Jan. 31, 2012.

* cited by examiner

*Primary Examiner* — Nicole M Buie-Hatcher
*Assistant Examiner* — M. Reza Asdjodi
(74) *Attorney, Agent, or Firm* — Brinks Gilson & Lione (57) ABSTRACT

The invention relates to cathode materials for Li-ion batteries in the quaternary phase diagram $Li[Li_{1/3}Mn_{2/3}]O_2$—$LiMn_{1/2}Ni_{1/2}O_2$—$LiNiO_2$—$LiCoO_2$, and having a high nickel content. Also a method to manufacture these materials is disclosed. The cathode material has a general formula $Li_a((Ni_z(Ni_{1/2}Mn_{1/2})_yCo_x)_{1-k}A_k)_{2-a}O_2$, wherein $x+y+z=1$, $0.1 \leq x \leq 0.4$, $0.36 \leq z \leq 0.50$, A is a dopant, $0 \leq k \leq 0.1$, and $0.95 \leq a \leq 1.05$, and having a soluble base content (SBC) within 10% of the equilibrium soluble base content.

14 Claims, 7 Drawing Sheets

HIGH NICKEL CATHODE MATERIAL HAVING LOW SOLUBLE BASE CONTENT

This application is a National Stage application of International Application No. PCT/EP2012/051492, filed Jan. 31, 2012, which claims the benefit of U.S. Provisional Application No. 61/457,250, filed Feb. 10, 2011. This application also claims priority under 35 U.S.C. §119 to European Patent Application No. 11000945.3, filed Feb. 7, 2011.

TECHNICAL FIELD AND BACKGROUND

The invention relates to cathode materials for Li-ion batteries in the quaternary phase diagram $Li[Li_{1/3}Mn_{2/3}]O_2$—$LiMn_{1/2}Ni_{1/2}O_2$—$LiNiO_2$—$LiCoO_2$, and having a high nickel content. Also a method to manufacture these materials is disclosed.

For a long time $LiCoO_2$ (or "LCO") was the dominating cathode material for rechargeable lithium batteries. LCO has a relatively high capacity (150-160 mAh/g at 3-4.3V) together with a high density (true density about 5.05 g/cm$^3$) and is relatively easy to be produced with good quality. It has a relative high Li diffusion so it is possibly to utilize larger, dense particles (10-20 µm size) with small surface area (0.1-0.5 m$^2$/g). These large, dense, low surface area particles can easily be prepared with a small amount of soluble surface base—as will be defined in more detail below. All in all commercial LCO is a robust and easy to manufacture cathode powder.

LCO is also a "friendly" material during battery production. It is easily processed by battery producer (slurry making, coating, compacting of electrodes, . . . ). It allows to obtain electrodes of low porosity thus more powder can fit into the confined space of a battery ultimatively resulting in a high energy density. For a long time these nice properties ensured the dominance of $LiCoO_2$ for rechargeable lithium batteries for portable applications. LCO however also has serious drawbacks. A main drawback is the relative scarcity of Co resources related to it is the relatively high cost of cobalt metal. Still worse, historically the cobalt prize shows wild fluctuations, and these fluctuations possibly increased the need to find substitutes for $LiCoO_2$.

The main substitute for LCO, which has emerged commercially within the last 5 or so years, is Lithium-nickel-manganese-cobalt-oxide. This material belongs to the quaternary phase diagram $Li[Li_{1/3}Mn_{2/3}]O_2$—$LiMn_{1/2}Ni_{1/2}O_2$—$LiNiO_2$—$LiCoO_2$. Additionally this composition can be modified by doping. It is known for example, that elements like Al, Mg, and sometimes Zr can replace Co, Ni or Mn. Within the complex quaternary phase diagram there is a wide degree of freedom to prepare electrochemically active phases with different composition and quite different performance. Generally, for the production of cathode materials with complex compositions, special precursors such as mixed transition metal hydroxides need to be used. The reason is that high performance Li—M—$O_2$ needs well mixed transition metal cations. To achieve this without "oversintering" the cathode the cathode precursors need to contain the transition metal in a well-mixed form (on atomic level) as provided in mixed transition metal hydroxides, carbonates etc.

When mixed transition metal hydroxides are used as precursors, they are obtained by co-precipitating transition metal sulphates and technical grade bases like NaOH, which is amongst the cheapest industrial route for Li—M—$O_2$ precursor preparation. This base contains $CO_3^{2-}$ anions in the form of $Na_2CO_3$, which are subsequently trapped in the mixed hydroxide—the mixed hydroxide typically containing between 0.1 and 1 wt % of $CO_3^{2-}$. Besides the transition metal precursor, the lithium precursor $Li_2CO_3$, or a technical grade LiON*$H_2O$, often containing at least 1 wt % of $Li_2CO_3$ is used. In the case of high nickel cathodes "LNO", like $LiNi_{0.8}Co_{0.2}O_2$ when the lithium hydroxide and transition metal precursors are reacted at high temperature, typically above 700° C., the $Li_2CO_3$ impurity remains in the resulting lithium transition metal oxide powder, especially on its surface. When higher purity materials are used, less $Li_2CO_3$ impurity is found, but there is always some LiOH impurity that reacts with $CO_2$ in the air to form $Li_2CO_3$. The use of high purity materials is proposed in JP2003-142093, however such expensive precursors are not preferred.

It is convenient to simplify the quaternary phase diagram when discussing phase relations. In the following we will use the ternary phase diagram to discuss properties of layered $LiMO_2$ cathodes: $X^*LiCoO_2 + Y^*LiNi_{1/2}Mn_{1/2}O_2 + Z^*LiNiO_2$, with $X+Y+Z=1$.

When X increases the consequences are:
raw materials cost increase (high cost of Co),
production usually becomes more easy, and
rate performance improves.
When Z increases:
production becomes more difficult,
reversible capacity increases,
air stability decreases,
content of soluble base increases, and
safety deteriorates.

The cathodes in this diagram can have the general formula $Li_a((Ni_z(Ni_{1/2}Mn_{1/2})_yCo_x)_{1-k}A_k)_{2-a}O_2$, wherein $x+y+z=1$, and A is a dopant, with $0 \leq k \leq 0.1$, and $0.95 \leq a \leq 1.05$. The values of x,y,z correspond to the above described values of X, Y and Z respectively.

Within the ternary phase diagrams commercially interesting members include "NCA" (e.g. $LiNi_{0.8}Co_{0.15}Al_{0.05}O_2$) or "111" (e.g. $Li_{1.05}M_{0.95}O_2$ with $M=Ni_{1/3}Mn_{1/3}Co_{1/3}$) or "532" (e.g. $LiMO_2$ with $M=Ni_{0.5}Mn_{0.3}Co_{0.2}$). These different members have very different properties. NCA for example, has a very high capacity, by far exceeding $LiCoO_2$. But it is very difficult to prepare since $CO_3$ free precursors—like purified LiOH—are needed, and a $CO_2$ free reaction atmosphere—like oxygen—and the final cathode material is sensitive to moisture exposure. It is unstable during long air exposure and it typically has a very high content of soluble base. On the other hand, "111" is very easy to prepare, for example from a mixed precursor and $Li_2CO_3$. The resulting cathode is very robust and the content of soluble base is small. However, the reversible volumetric capacity is lower than $LiCoO_2$ and sometimes even the rate performance is insufficient.

As discussed in U.S. Pat. No. 7,648,693, the content of soluble base obtained for a given cathode powder can be determined in a reproducible manner by pH titration, which depends on parameters such as the total soaking time of powder in water. Bases are originating mainly from two sources: first, impurities such as $Li_2CO_3$ and LiOH present in the Li—M—$O_2$; second, bases originating from ion exchange at the powder surface: $LiMO_2 + \delta H^+ \leftarrow \rightarrow Li_{1-\delta}H_\delta MO_2 + \delta Li^+$.

Recently cathode materials with compositions like "532" (X=Z=0.2) became very serious challengers to LCO. Whereas "111" (X=⅓, Y=⅔, Z=0) and "NCA" (Z=0.8) did not successfully substitute LCO in commercial applications the situation is different for "532". "111" was not successful (Z too low) due to low energy density (a battery with 111 has lower capacity than the same design with LCO), NCA was not successful by the opposite reason (Z much too high) because of high content of soluble base, high sensibility and relatively high production cost. However, "532" has higher capacity than "111" and is much more robust than "NCA". The production is more difficult than "111" but much cheaper than "NCA". So "532" allows to substitute LCO without loosing energy density, and a cheap production process is manageable.

An essential requirement to successfully replace $LiCoO_2$ is a cheap and simple production process. Preferably—as lithium precursors—lithium carbonate is used and the firing is done in normal air. At the same time, there is a strong trend to increase "Z" thus pushing the energy density further up. The current art however teaches that there is a limit to increase Z using such a process: in US2006/0233696 for example it is said that, for Z>0.35, the doped $LiNiO_2$ cannot be prepared in air on a large scale and $Li_2CO_3$ cannot be used as a precursor. That is because this document believes that a good Ni-based lithium transition metal oxide can only be obtained when it is substantially free of soluble bases. It is an aim of the current invention to go beyond this belief and develop methods to achieve good quality products with higher Z values whilst using low cost technical grade precursor materials. If a high capacity, good performance and low price cathode material is available it will very much boost the substitution of LCO in all applications. But: "High Z" materials prepared by a cheap process often have a high content of soluble base. This problem is also addressed in the present invention.

To summarize, a production process is needed which allows to produce "high Z" materials having a good quality with a low (but not too low—as will be discussed below) content of soluble base, and at low cost. Particularly the base content of soluble base needs to be optimized without jeopardizing performance and production cost.

SUMMARY

The current patent application discloses "high Z" materials and a process to produce such materials to solve the above mentioned problems. Viewed from a first aspect, the invention can provide a lithium transition metal oxide powder for use as a positive electrode material in lithium-ion batteries, sintered under air, having a general formula $Li_a((Ni_z(Ni_{1/2}Mn_{1/2})_yCo_x)_{1-k}A_k)_{2-a}O_2$, wherein x+y+z=1, 0.1≤x≤0.4, 0.36≤z≤0.50, A is a dopant, 0≤k≤0.1, and 0,95≤a≤1.05, and having a soluble base content (SBC) within 10% of the equilibrium soluble base content ($SBC_e$). The invention can also provide a positive electrode material for lithium ion batteries, comprising a lithium transition metal oxide having a general formula $Li_a((Ni_z(Ni_{1/2},Mn_{1/2})_yCo_x)_{1-k}A_k)_{2-a}O_2$, wherein x+y+z=1, 0.1≤x≤0.4, 0.36≤z≤0.50, A is a dopant, 0≤k≤0.1, and 0,95≤a≤1.05, and having a soluble base content (SBC) that remains constant or increases by less than 10% upon heating the oxide powder at a temperature between 500° C. and the sintering temperature of the powder during 5 to 10 hours under air. The invention can further provide a positive electrode material for lithium ion batteries, comprising a lithium transition metal oxide having a general formula $Li_a((Ni_z(Ni_{1/2},Mn_{1/2})_yCo_x)_{1-k}A_k)_{2-a}O_2$, wherein x+y+z=1, 0.1≤x≤0.4, 0.36≤z≤0.50, and preferably 0.40≤z≤0.45, A is a dopant, 0≤k≤0.1, and 0,95≤a≤1.05, and having a soluble base content (SBC) that remains constant or increases by less than 10% upon heating the oxide powder at a temperature of 790° C. for 10 hours under air.

The invention can also provide a positive electrode material for lithium ion batteries, comprising a lithium transition metal oxide having a general formula $Li_a((Ni_z(Ni_{1/2}Mn_{1/2})_yCo_x)_{1-k}A_k)_{2-a}O_2$, wherein x+y+z=1, 0.1≤x≤0.4, 0.36≤z≤0.50, and preferably 0.40≤z≤0.45, A is a dopant, 0≤k≤0.1, and 0.95≤a≤1.05, and having a BET value between 0.22 and 0.40 $m^2/g$, and having a soluble base content (SBC) between 80 and 120 μmol/g.

In one embodiment the surface of the lithium transition metal oxide powder is free of both lithium carbonate and LiOH phase impurities. The powders are not coated. In another embodiment, (SBC-$Li_2CO_3$)≥0.085 wt %, preferably >0.1 wt %, where (SBC-$Li_2CO_3$) is the base content of a $Li_2CO_3$ type base, and the soluble base content (SBC) of the lithium transition metal oxide is the sum of the contents of the $Li_2CO_3$ type base (SBC-$Li_2CO_3$) and a LiOH type base (SBC-LiOH). In still another embodiment (SBC-$Li_2CO_3$)/(SBC-LiOH)>0.2, preferably >0.5 and more preferably >0.7, wherein both (SBC-$Li_2CO_3$) and (SBC-LiOH) are expressed in wt %. The values in these embodiments for (SBC-$Li_2CO_3$) on the one hand, and (SBC-$Li_2CO_3$)/(SBC-LiOH) on the other hand, are typically obtained when technical precursor materials are used that contain a lot of $CO_3^{2-}$ type impurity. When the lithium transition metal oxide powder is not sintered under air—but eg under oxygen—or when high purity precursors are used, like pure LiOH, then (SBC-$Li_2CO_3$)<0.085 wt %, and/or (SBC-$Li_2CO_3$)/(SBC-LiOH)≤0.2, but this practice results in a much higher cost of manufacturing, and, as will be shown below, it results in a lower material performance for "High Z" materials.

In still another embodiment, in the lithium transition metal oxide powders formula: 0.40≤z≤0.45. In this more narrow z value range very useful compounds can be developed, like $LiMO_2$ with M=$Ni_{0.6}Mn_{0.2}Co_{0.2}$. In another embodiment the lithium transition metal oxide powder has a BET value between 0.22 and 0.40 $m^2/g$, and a SBC between 80 and 120 μmol/g, corresponding to the equilibrium SBC value ($SBC_e$) powders with 0.40≤z≤0.45. These values can provide excellent performances. In still another embodiment, the lithium transition metal oxide powder has a surface specific SBC between 80 and 125 μmol/$m^2$, the surface specific SBC being the ratio between SBC and BET surface area, the BET surface area being measured after washing and drying. In one embodiment the dopant A can be Al, Ti or Mg. Al can be doped up to 10 mol %, whilst Ti and Mg are, according to another embodiment, limited to 5 mol %. In another embodiment the dopant can be B, Ca, Mn, Cr, V, Fe, Zr, S, F, P or Bi. Their content may be limited to 1 mol %.

The invention discloses uncoated Li-nickel-manganese-cobalt-oxides used as cathode in Li rechargeable batteries with higher capacity obtained by a larger content of nickel. High nickel cathodes typically contain LiOH and $Li_2CO_3$ impurities. The current invention can provide high nickel cathodes free of impurities, and in one embodiment with a content of soluble base near to or at the equilibrium value of about 80-120 mmol/g.

It might appear that it is desirable to reduce the content of soluble base further to reach very low or even zero level. Surprisingly, it was found that a too low content of soluble base is undesired. What is desired for the positive electrode material of the invention, is a certain equilibrium base content, not zero, but less than a cathode material which has a $Li_2CO_3$, LiOH or $Li_2O$ impurity. It will be explained in more detail below that the concept of soluble base is a surface property rather than an impurity. The current invention can provide for novel cathode materials which contain the correct amount of soluble base, which base furthermore does not originate from impurities. In order to establish if a lithium transition metal oxide powder has the equilibrium soluble base content $SBC_e$, its initial soluble base content $SBC_i$ is determined as described in Example 2. Hereafter a sample of the powder is re-heated under air at a temperature T of at least 500° C., and less than the temperature where the morphology of the powder starts to change by sintering (which is easy to check using SEM), during a time t of typically 5 to 10 hrs under air, and for the re-heated sample the soluble base content $SBC_d$ is determined. If the difference between $SBC_d$ and $SBC_i$ is less than 10% of $SBC_i$, the powder has the equilibrium soluble base content $SBC_e$. In one embodiment, in particular for a value of $0.40 \leq z \leq 0.45$, the re-sintering temperature is set at 790° C., and t is 10 hr.

It should be mentioned also that U.S. Pat. No. 7,648,693 describes a cathode material with a low content of soluble base. However, the patent only discloses relatively small values of Z ($Z \leq 0.35$), contrary to the present invention. US2010-0112447 discloses a composite oxide represented by the general formula: $Li_aNi_xMn_yCo_zO_{2+b}$ wherein $0.97 \leq a \leq 1.05$, $-0.1 \leq b \leq 0.1$, $0.45 \leq x \leq 0.65$, $0.15 \leq y \leq 0.35$, $0.15 \leq z \leq 0.25$, and $x+y+z=1$. This document however is silent about the need to provide high Ni materials with a soluble base content close to or at the equilibrium soluble base value. Examples are only provided of the "532" compound, that is for a Z value of 0.2. US2004-191161 on the other hand discloses "NCA" type Li—Ni—Co—M—$O_2$ cathode materials (M being one or more of Mn, Al, Ti, Cr, Mg, Ca, V, Fe and Zr) prepared in oxygen. The current application discloses cathode materials with much lower Z that can be prepared in a carbon dioxide containing atmosphere (air). As a result soluble base is present, and a part of the soluble base is $Li_2CO_3$, but contrary to the cited prior art this soluble base corresponds to and expresses a surface property and does not originate from an impurity. WO2009-021651 discloses cathode materials that are obtained after washing or washing and reheating. These materials contain a too small amount of soluble base, being less than the equilibrium value. The invention discloses cathode materials with a selective range for Z, and containing a certain amount of soluble base that is higher than in washed (and reheated) cathode materials, and near to or at the equilibrium value.

Viewed from a second aspect, the invention can provide a method for preparing the powderous lithium transition metal oxide described above, comprising the steps of:
providing a transition metal precursor prepared from the co-precipitation of transition metal sulphates with a base;
providing a lithium precursor selected from the group consisting of technical grade LiOH*$H_2O$ containing a carbonate impurity, and $Li_2CO_3$;
mixing the transition metal precursor and the Li precursor, sintering the mixture under a forced flow of air of at least 2 $m^3$/kg mixture, and
preferably at least 6 $m^3$/kg mixture, at a temperature T between 800° and 1000° C., and preferably at 850 to 960° C., for a time t between 1 and 48 hrs. For practical reasons the time can be set between 12 and 40 hrs, or even between 12 and 24 hrs. In this way the temperature used, the heating time and the amount of air blown can be optimized. In one embodiment the transition metal precursor is obtained by co-precipitating transition metal sulphates and technical grade bases like NaOH. In another embodiment, the sintering step is preceded by a heating step of at least 5 hrs at a temperature of at least 650° C. and less than 800° C., under a forced flow of air of at least 2 $m^3$/kg mixture.

In yet another embodiment, the transition metal precursor is a mixed hydroxide containing between 0.1 and 1.0 wt % $CO_3^{2-}$. In a further embodiment, the lithium precursor is a technical grade LiOH*$H_2O$ containing at least 1 wt % of $Li_2CO_3$.

The invention may also provide a method for preparing a positive electrode material $LiMO_2$, where $M=(Ni_z(Ni_{1/2}Mn_{1/2})_yCo_x)_{1-k}A_k)_{2-a}$, comprising the steps of:
providing a transition metal precursor MOOH prepared from the co-precipitation of transition metal sulphates with a base;
mixing the transition metal precursor with $Li_2CO_3$, and sintering the mixture under a forced flow of air of at least 2 $m^3$/kg mixture, and preferably at least 6 $m^3$/kg mixture, at a temperature T between 800° and 1000° C., and preferably at 850 to 960° C., for a time t between 12 and 40 hrs, preferably between 12 and 24 hrs, until no more $CO_2$ is produced from the reaction MOOH+ ½$Li_2CO_3$=>$LiMO_2$+½$CO_2$+½$H_2O$. This method can provide a cheap way of making air stable lithium transition metal oxide powders using cheap precursors that contain carbonate impurities, which method is performed under air (containing $CO_2$) instead of using an expensive pure oxygen atmosphere.

In order to reach the equilibrium soluble base content for a powderous lithium transition metal oxide having the composition as described above, without knowing however if the product fulfills the conditions of the invention, a research schedule can be developed comprising the steps of:
(a) providing a sample of the powderous lithium transition metal oxide, where the oxide was prepared at a temperature $T_b$, for a time $t_b$ whilst providing a total flow of air of $D_b$ $m^3$ per kg precursor mixture—the precursor being prepared as described above,
(b) determining the soluble base content $SBC_b$ of the oxide,
(c) subjecting the sample to a reheating at a temperature T of at least 500° C., and less than the temperature where the morphology of the powder starts to change by sintering, during a time t of 5 to 10 hrs under air,
(d) determining the soluble base content $SBC_d$ of the reheated sample,
(e) checking if $(SBC_d-SBC_b) \leq (0.1*SBC_d)$, and if not:
(f) setting new parameters $T_r \geq T_b$, $t_r \geq t_b$ and $D_r \geq D_b$, and fulfilling either one or more of the extra conditions:
$T_r>T_b$,
$t_r>t_b$,
$D_r>D_b$,
(g) preparing a new batch of lithium transition metal oxide under conditions set by parameters $T_r$, $t_r$ and $D_r$ (these valued are now replacing the previous values $T_b$, $t_b$, $D_b$),
(h) repeating steps (b) to (e).

If in step (e) the condition $(SBC_d-SBC_b) \leq (0.1*SBC_d)$ is fulfilled the parameters $T_b$, $t_b$, $D_b$ can be retained for the sintering step in the preparation of the lithium transition metal oxide and the process according to the invention is achieved, or in case that new parameters had to be set during the repetition step (or steps), the final parameters $T_r$, $t_r$ and $D_r$ are the values to be used in the process according to the invention.

In one embodiment the transition metal precursor is a mixed Ni—Mn—Co hydroxide or oxyhydroxide. In another embodiment the mixed Ni—Mn—Co hydroxide or oxyhydroxide further comprises dopant A. In one embodiment of the research schedule $T_b$ is at least 900° C., and step (d) is performed at a temperature between $T_b-120$ and $T_b-80°$ C. In another embodiment $t_b$ is between 12 and 24 hr, and $t=t_b$.

BRIEF DESCRIPTION OF THE DRAWINGS

FIG. 7.1: total SBC as function of stirring time (μmol/g vs. sq. root of time)

FIG. 7.2: LiOH and $Li_2CO_3$ fraction of the SBC as function of stirring time (wt % vs. sq. root of time)

DETAILED DESCRIPTION

The current invention is related to a better understanding of the phenomenon which we call "soluble base content", which will be referred to as "SBC" in the following. It is very important to understand that—in a well prepared cathode material powder such as can be provided by the current invention—SBC is not an impurity but rather a surface property. The surface property can be quantitatively measured by the analysis of reaction products between the surface and water. If powder is immersed into water a surface reactions occurs. During the reaction the pH of the water increases ("base dissolves") so the base is quantified by a pH titration. The result of the titration is the "soluble base content" (SBC).

It is possible to prepare cathode powders that have a lower SBC—much smaller than the preferred value which is referred to as "equilibrium value $SBC_e$"—but in this case a poor performance is achieved. It is also undesired that the SBC is much higher than its equilibrium value, this will happen if impurities like $Li_2CO_3$, LiOH or $Li_2O$ are present at the surface. The pH titration method used to determine the SBC is explained in Example 2 below.

In the ternary phase diagram $X*LiCoO_2+Y*LiNi_{1/2}Mn_{1/2}O_2+Z*LiNiO_2$, if Z is very high (e.g. Z=1 for pure $LiNiO_2$) the bulk of the cathode material is not moisture and air stable. On the contrary, if Z is small (e.g. Z=0.2 for $LiNi_{0.5}Mn_{0.3}Co_{0.2}O_2$) the bulk of the cathode material is stable. This observation is the result of humidity exposure experiments. In a typical humidity exposure experiment samples are stored for an extended time in moist air (e.g. 50%) at an elevated temperature (e.g. 30° C.). In the case of high Z reactions like $LiNiO_2+CO_2 \rightarrow Li_{1-x}Ni_{1+x}O_2+a Li_2CO_3$ slowly proceed if $CO_2$ and moisture is present. A pH titration of $LiNiO_2$ samples after an increasing storage time in moist air (e.g. 50%) at elevated temperature (e.g. 30° C.) will result in increasing values for SBC. When Z is low then the bulk is stable in normal air. We observed that the SBC of "111" and LCO (both Z=0) practically remains unchanged during extended storage. For intermediary Z it is observed that during humidity exposure tests after a relatively short time the SBC is stable. Similar results are obtained when powder is immersed in water and after extended stirring the SBC is measured. The SBC is relatively stable for low Z like "111", SBC increases a relatively short time and then stabilizes for intermediary Z like "532" and SBC continuously increases in the case of high Z like "NCA".

The measured SBC is the result of a reaction of the surface of the particles with water. In fact, the water changes the surface. Adsorbed molecules might dissolve and create soluble base which contributes to the SBC. For example Li—O bonds on the surface might be replaced by OH bonds and create dissolved LiOH base. Li—C—O bonds might dissolve to create $Li_2CO_3$ base. A further contribution to the SBC is an ion exchange ("IX") mechanism. If Z is not too large then Li in the bulk does not react with water. But the thermodynamic stability becomes less towards the surface so Li is more reactive. The result is an IX reaction $LiMO_2 + H_3O^+ \rightarrow HMO_2 + LiOH + H_2O$. The ion exchange reaction proceeds slowly towards deeper lying atomic layers until—in the bulk—the lithium cannot be exchanged anymore. The continuous advance (in depth) of the IX causes an increase of dissolved base for a certain time (a few minutes) until saturating. Typically a few monolayers of lithium take part in the ion exchange. With increasing Z values Li is less strongly bound. Thus the IX phenomenon involves deeper and deeper lying atomic layers until saturation, and the LiOH type SBC increases with Z.

It is also known that the reversible electrochemical capacity increases with Z, hence there is a correlation between reversible capacity and equilibrium $SBC_e$: increasing the reversible capacity generally causes a higher equilibrium value for $SBC_e$.

In the further processing of the cathode active material, a high SBC (higher than the equilibrium value $SBC_e$) is related to several highly undesired phenomena. First, the large scale preparation of electrodes by coating requires that coating slurries (containing amongst others the cathode active material and a binder in a solvent) are stable. We refer to this property as "slurry stability". A good slurry stability means that the viscosity does not change dramatically during coating. In a worst case scenario "gelation" of the slurry can occur, making the coating impossible. A good slurry stability also means that the quality of the dispersion of cathode powder, conductive additives, etc. in the binder solution does not change. In a worst case scenario flocculation can occur, causing carbon-carbon and/or cathode-cathode agglomeration. It was observed that high SBC tends to cause a poor slurry stability. Especially undesired is a large LiOH type fraction of the SBC.

Furthermore, if the cathode contains high SBC then the high temperature performance of batteries is influenced. During high temperature exposure of charged batteries gas evolves. In the case of prismatic and polymer cells this gas evolution is highly undesirable because it causes bulging of the cells. It was also observed that these undesired effects are depending on the composition of SBC and the content of moisture, including chemically adsorbed moisture of the cathode powder. Higher moisture and higher content of carbonate type SBC are especially undesired.

An obvious approach to reduce SBC is a washing and drying or washing and reheating approach. Such approaches make sense if SBC is assumed to be a surface impurity. Washing will simply remove the impurity. After washing, measurement of SBC gives negligible values. But the approach fails because SBC is not an impurity but a surface property. During washing, first, adsorbed surface molecules are dissolved or modified. Secondly an IX proceeds until a certain level of saturation. Near to the surface this results in protons being present instead of Li cations. We observed that washed and reheated cathodes have poor electrochemical performances. Possibly protons are still present, which causes poor performances in real cells.

An improved washing process includes the re-heating of the cathode in order to remove the protons. These protons that are removed by reheating need to be replaced by something else, since the layered phases usually do not tolerate cationic vacancies. Possibly they are replaced by other cations, and possibly the removal of protons causes a loss of oxygen from the crystal structure, following the reaction $2H^+ + O^{2-} \rightarrow H_2O$. As a result the crystal structure near to the surface contains defects. Poor performances are observed for washed and reheated cathodes as well. It is assumed that these defects are the root cause for the poor performance. It is thus concluded that a cathode material without or with a SBC under the equilibrium value exhibits a poor performance.

In general, a cheap and simple cathode forming process uses $Li_2CO_3$ as lithium precursor. Compared to other Li precursors $Li_2CO_3$ has the following advantages: (1) its low price, (2) its non-hydroscopic character and (3) its high melting point. Most of the $Li_2CO_3$ reacts with the metal precursor (such as a mixed nickel-manganese-cobalt hydroxide) before the temperature reaches the $Li_2CO_3$ melting point. There is less tendency for de-mixing due to a flow-down effect. If unreacted $Li_2CO_3$ remains in the final cathode a high SBC value is measured. Furthermore a poor slurry stability and excessive bulging of the battery is observed.

Poorly prepared cathode materials have a high SBC (higher than the equilibrium value $SBC_e$) which originates from unreacted lithium precursor. To increase the completeness of reaction the following actions can be envisaged:
(1) increasing the reaction time, (2) increasing the reaction temperature, and (3) increasing the effective air flow rate, leading to a more efficient removal of $CO_2$ reaction product. If the reaction is completed a typical value of SBC is obtained, that depends on the materials morphology—its effective surface area—and its composition. This typical value is the $SBC_e$ equilibrium value. As Z increases with higher Ni content, it becomes more and more difficult to reach the equilibrium value. The best performance is achieved when the cathode material has an SBC near to the equilibrium value $SBC_e$. Further decrease of SBC, for example by washing, results in a poorer performance.

The current invention can provide cathode materials that are free of LiOH, $Li_2CO_3$, and $LiOH*H_2O$ impurities (in the sense of comprising a secondary impurity phase), and having an SBC near to the equilibrium value $SBC_e$.

The invention is further illustrated in the following examples:

Example 1: Reaction Kinetics for Different "Z" Values

Different mixed transition metal hydroxides precursors are obtained from a mass production or pilot plant precipitation line. These precursors are prepared by precipitation of $MSO_4$ precursor by NaOH in the presence of a complexing agent ($NH_4OH$) followed by drying in air. The different precursors are MOOH and will result in Li compounds with increasing Z values:
1) $M1=Ni_{1/3}Mn_{1/3}Co_{1/3}$ (corresponding to Z=0 in the final $LiMO_2$) (reference example),
2) $M2=Ni_{0.533}Mn_{0.267}Co_{0.2}$ (Z=0.267) (reference example),
3) $M3=Ni_{0.667}Mn_{0.222}Co_{0.111}$ (Z=0.444).

Figure 1:
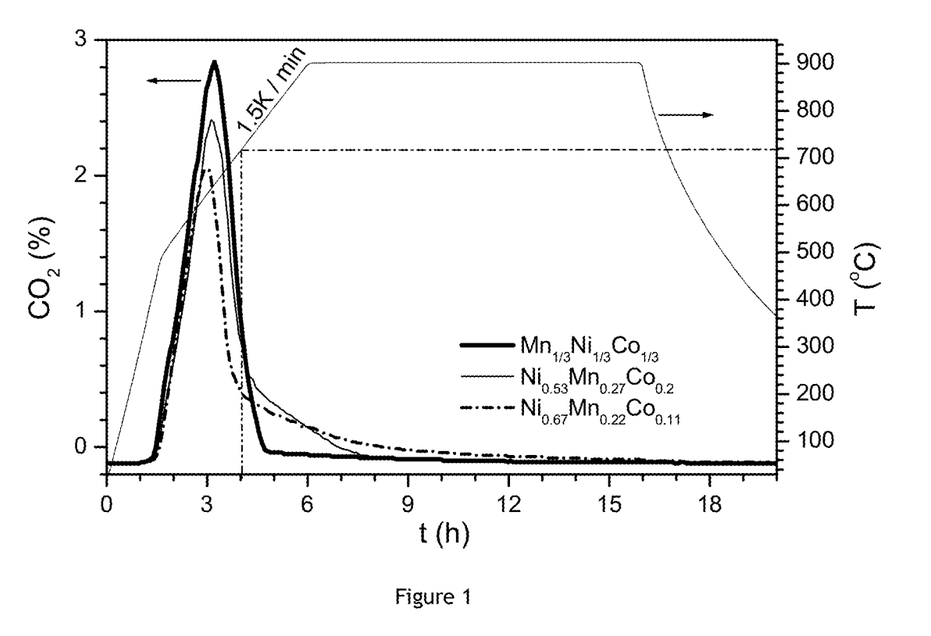
FIG. 1: Applied temperature profile and obtained $CO_2$ profile during firing reaction of precursor blend with different compositions in a flow of air.

The morphology of the precursors is quite similar: they have 8-10 μm sized spherical particles with a tap density of about 2 g/cm³. These precursors are well mixed with appropriate amounts of $Li_2CO_3$, so as to obtain the following Li:M blend ratios: M1) 1.1:1, M2) 1.01:1, M3) 1.01:1. Trays of approx. 23×23×8 cm size are filled with 1 kg of the blends. The blend occupies about 50% of the tray volume. The trays are heated in a laboratory chamber furnace in a flow of air (20 L/min). First a heating rate of 5K/min (until 500° C.), then a heating rate of 1.5 K/min (to 900° C.) is used, followed by a dwell time of 12 hours at 900° C. During the reaction a small amount of gas is pumped from the furnace to a $CO_2$ analyser for monitoring the $CO_2$ content of the reaction gas. FIG. 1 shows the obtained results for the temperature and $CO_2$ concentration as a function of heating time. It is noted that the absolute values for the $CO_2$ pressure might not be 100% correct but the relative values are sufficient to discuss the reaction kinetics qualitatively. The figure also shows the approximate melting temperature of $Li_2CO_3$ (715° C.) as a dotted line.

Obviously the reaction $MOOH + \frac{1}{2}Li_2CO_3 \rightarrow LiMO_2 + \frac{1}{2}CO_2 + \frac{1}{2}H_2O$ (1) starts at about the same temperature (about 500° C.) with the same intensity for the 3 blends. However, as the reaction proceeds the kinetics slow down, and the maximum reaction rate decreases with Z. The reaction finishes quickly for $Ni_{1/3}Mn_{1/3}Co_{1/3}$ (Z=0): already after about 4-5 hr the $CO_2$ evolution reaches zero. For $Ni_{0.533}Mn_{0.267}Co_{0.2}$ (Z=0.267) the reaction rates decreases fast until about 715° C., where the remaining $Li_2CO_3$ melts (molten salt reacts faster!) and the reaction rate continues to decrease but at slower rate. The reaction is finally finished after about 8 h. For $Ni_{0.662}Mn_{0.222}Co_{0.111}$ (Z=0.444) the same change of slope is observed at 715° C., after which the reaction rate decreases very slowly. Finally the reaction becomes gradually slower and slower and its rate approaches zero after about 15 hours.

The reaction kinetics are gas phase limited. $CO_2$ can only escape as long the surrounding gas has a partial pressure that is lower than the $CO_2$ equilibrium partial pressure for the corresponding composition. The equilibrium pressure generally decreases with increasing Ni:Mn. During the lithiation, initially the $CO_2$ pressure is high. As the lithiation reaction proceeds the Li:M in the crystal structure increases and the equilibrium $CO_2$ partial pressure decreases. The lithiation reaction can only finish if the gas flow has effectively removes the evolved $CO_2$. The lower the equilibrium $CO_2$ partial pressure the less $CO_2$ can be removed by the gas flow.

It can be concluded that with small Z the reaction proceeds fast. As Z increases the reaction rate decreases and approaches the zero rate slower and slower. Obviously it becomes increasingly difficult to finish reaction (1) to 100%. If the reaction is not fully finished then unreacted $Li_2CO_3$ remains. The unreacted $Li_2CO_3$ causes a high value of SBC. In this case the SBC is caused by the presence of a surface impurity. If the reaction is fully finished then no unreacted $Li_2CO_3$ is present and the SBC is related to the surface property and not to an impurity.

Example 2: Measurement of SBC of a Sample LiMO$_2$

This Example demonstrates a possible method to measure SBC: a pH titration at constant flow. In the following Examples (3-9) this method is used to measure the SBC.

First a pH electrode is calibrated. 5 g of cathode powder is added to 100 g of de-ionized (DI) water in a closed flask and stirred for 10 minutes. The slurry is filtered under suction and about 98-99 g of clear solution is obtained. The filtering takes only a few seconds. 90 g of the clear solution is used for the pH titration experiment, and can be kept in an open 250 ml glass flask. The pH titration starts within 1 minute after finishing the filtering. During the pH titration experiment the electrode is inserted into the clear solution, which is continuously stirred. After 30 sec the addition of acid (0.1M HCl) is started. The acid is added at a rate of 0.5 ml/min. pH data points can be recorded each 3 seconds. The pH titration occurs at room temperature. The pH titration is finished when a value below pH=3.0 is achieved.

The calculation of SBC, and the separation of SBC into LiOH type and Li$_2$CO$_3$ type base is as follows: it is assumed that the total base contains only two contributions: (1) LiOH and (2) Li$_2$CO$_3$. A typical pH titration shows 2 inflection points. The first is at pH≅8.4, the second at pH≅4.7. Both inflection points originate from the Li$_2$CO$_3$ type of base and can be used to calculate the amount of Li$_2$CO$_3$ type base. To obtain the LiOH type base the Li$_2$CO$_3$ value is subtracted from the total base. To obtain the "weight specific soluble base content" (per g of cathode) the values are corrected for the sample mass and the fractions of solution used in the pH titration experiment. A convenient, often used way, is to express the obtained results as wt % of LiOH or wt % Li$_2$CO$_3$, which goes back to the conception of soluble base as "impurity".

The formulas used to calculate the different values are as follows:

$$SBC - Li_2CO_3(\text{wt \%}) = \frac{(V2 - V1) \times C_{HCl} \times M_{Li2CO3}}{1000 \times \{(W_{LiMO2} \times W_{Solution})/W_{DIwater}\}} \times 100(\%)$$

$$SBC - LiOH(\text{wt \%}) = \frac{(2 \times V1 - V2) \times C_{HCl} \times M_{LiOH}}{1000 \times \{(W_{LiMO2} \times W_{Solution})/W_{DIwater}\}} \times 100(\%)$$

wherein: V1, V2: ml of acid at inflection point 1, 2 (V2>V1);
$C_{HCl}$: concentration of HCl (0.1 mol/L);
W: weights of sample LiMO$_2$, used solution and stirred water;
M: molecular weights.

We prefer to express SBC in μmol/g, which values are obtained as:

$$SBC - Li_2CO_3 = \frac{2 \times (V2 - V1) \times C_{HCl}}{1000 \times \{(W_{LiMO2} \times W_{Solution})/W_{DIwater}\}}$$

$$SBC - LiOH = \frac{(2 \times V1 - V2) \times C_{HCl}}{1000 \times \{(W_{LiMO2} \times W_{Solution})/W_{DIwater}\}}$$

The total base content calculation is based on the total volume of HCl needed to reach the second inflection point at pH≅4.7: SBC-total (μmol/g)=(SBC-Li$_2$CO$_3$)+(SBC-LiOH) or $$SBC - \text{total} = \frac{V2 \times C_{HCl}}{1000 \times \{(W_{LiMO2} \times W_{Solution})/W_{DIwater}\}}.$$

Figure 2:
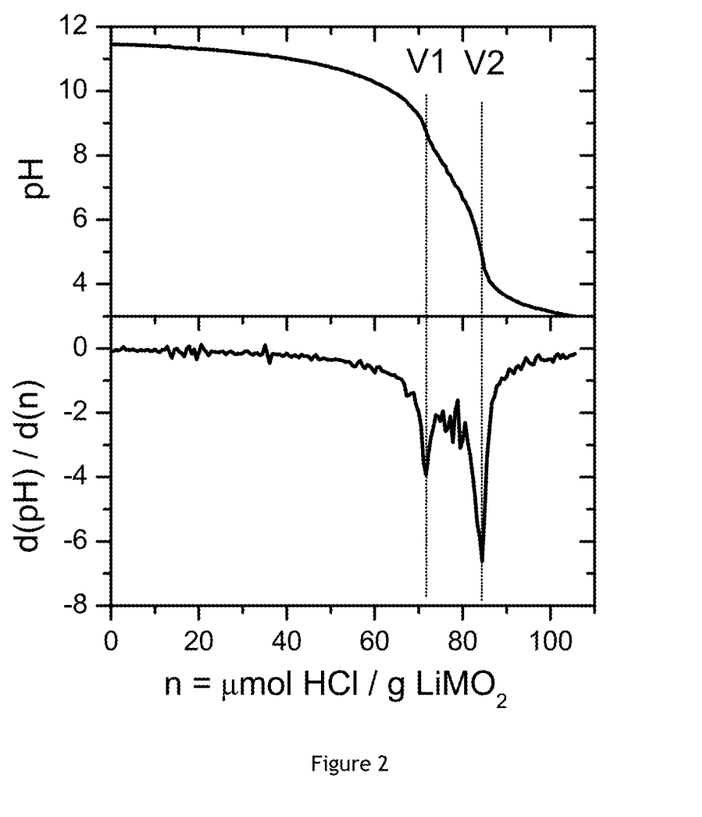
FIG. 2: Typical pH titration profile.

It needs to be emphasized that the obtained numbers for LiOH and Li$_2$CO$_3$ are the result of the reaction of the materials surface with water. For a well prepared (single phase) lithium transition metal oxide these numbers are not describing the presence of LiOH or Li$_2$CO$_3$ impurity being present as secondary phase of the surface. FIG. 2.1 shows a typical pH titration profile (the material measured being sample S8B of Example 8 below). The top figure shows the pH as function of acid addition (unit: μmol of acid per g of cathode), the bottom figure shows the derivative of the pH profile to show the inflection points V1 and V2.

Example 3: Equilibrium SBC$_e$ for Medium "Z" Material (Ni$_{0.667}$Mn$_{0.222}$Co$_{0.111}$, Z=0.444)

A mixed transition metal oxyhydroxide precursor MOOR is obtained from a small pilot plant precipitation line. The morphology is spherical with a tap density of approx. 2.2 g/cm$^3$. The D50 of the article size distribution is about 10 μm. The precursor is mixed with appropriate amounts of Li$_2$CO$_3$. The Li:M stoichiometric blend ratios for 4 different samples is listed in Table 1. 200 grams of the blend is filled in trays. 2 trays are simultaneously fired. The dwell temperature is 900° C. When a "normal" airflow of 5 L/min (=about 12 L/min·kg) and a "normal" dwell time of 12 hours is used the samples show a very high SBC and poor performance. Therefore the air flow is increased to 30 L/min, which is a very high number for 400 g blend. 2 series of samples are prepared using either 12 or 24 h firing time (2 trays with each 200 g blend cooked simultaneously). Table 1 summarizes the main data of the experiment and the electrochemical results.

TABLE 1

| Li:M blend ratio | Firing: Dwell time (h) | SBC μmol/g | Echem testing $Q_D$ mAh/g | $R_{2C}$ % | Firing: Dwell time (h) | SBC μmol/g | Echem testing $Q_D$ mAh/g | $R_{2C}$ % |
|---|---|---|---|---|---|---|---|---|
| 0.99 | 12 h | 196 | 178.0 | 87.3 | 24 h | 105 | 177.3 | 86.9 |
| 1.01 |  | 263 | 179.3 | 87.5 |  | 102 | 178.5 | 87.1 |
| 1.03 |  | 470 | 179.4 | 87.9 |  | 122 | 177.6 | 86.8 |
| 1.05 |  | 571 | 178.9 | 88.2 |  | 137 | 176.3 | 87.0 |

All samples have about the same electrochemical performance (The table lists discharge capacity values $Q_D$ at 0.1C (4.3-3.0V) and the rate performance $R_{2C}$=2C/0.1C, all tests being performed at 25° C.). The rate performance is slightly worse in the case of 24 h sintering because due to the long sintering time the final particles are slightly more sintered. However, a very large difference in total SBC is observed. Samples cooked for 12 hours have a 2-4 times higher SBC value than samples cooked for 24 hours (which are near to the equilibrium SBC). The SBC of the 12 hour cooked samples contains a large fraction of base caused by remaining unreacted $Li_2CO_3$ whereas the SBC of the 24 h cooked samples mostly originates from surface properties. For example, when the 24 h samples are grinded and recooked again the SBC does not decrease much further.

Cathode powders with more that 140-150 μmol/g SBC as achieved after 12 h cook will cause problems during slurry making and the high T storage performance (e.g. 5 h at 90° C.) of charged batteries (prismatic or cylindrical) will be very poor. Compared to this the 24 h cooked samples have a SBC near to the equilibrium value and will show much improved slurry properties and also much improved high T storage.

Hence Example 3 demonstrates—for cathodes with relatively high Z=0.444—that cooking in a very high air flow for a sufficient long time allows to prepare single phase cathode materials without residual $Li_2CO_3$ or LiOH impurities, and having a SBC near to the thermodynamic equilibrium value.

This equilibrium $SBC_e$ is dependent on the surface area (measured after washing and drying) and the material composition (High Ni:Mn and High Li:M values increase the $SBC_e$). It is possible to estimate a "surface specific SBC" (base divided by surface area). For samples with about the same morphology (surface area) and the same Li:M ratio it can be established that the $SBC_e$ increases by 2-3 times from Z=0 to Z=0.267, and doubles again from Z=267 to 0.444. Typical equilibrium values $SBC_e$ for a typical commercial morphology (spherical dense particles with D50 of about 8-10 μm with crystallite size—as observed by SEM—of 500 nm) increases from about 15-20 to 50-70 to 100-150 mmol/g (base per g of cathode). At the same time the reversible discharge capacity increases from 160→170→180 mAh/g.

Example 4: $SBC_e$ Value as a Function of Z

Figure 3:
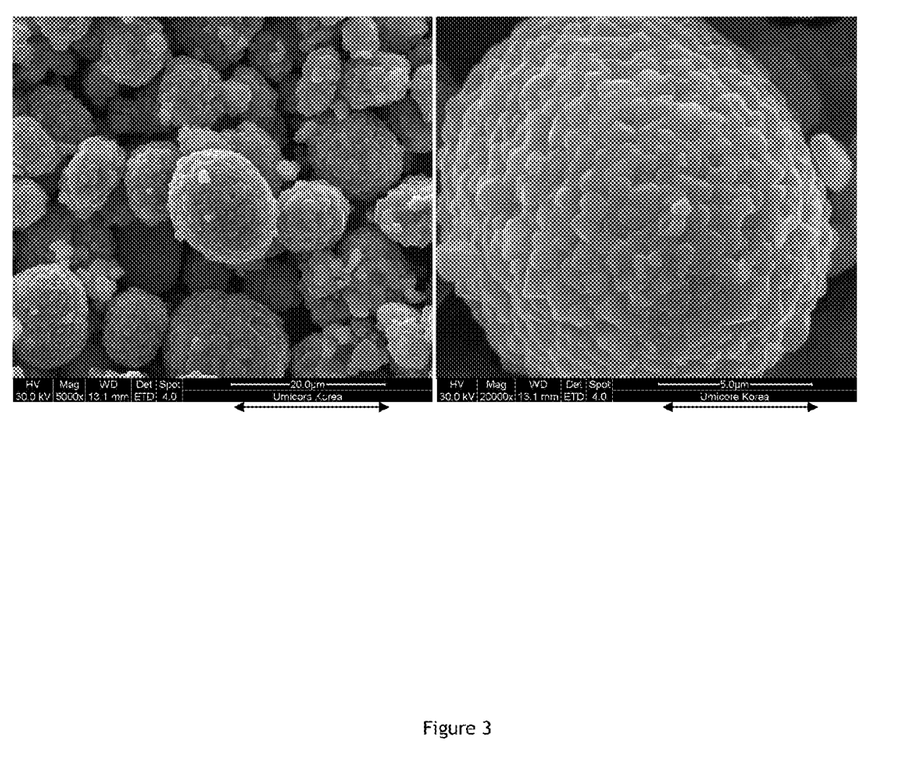
FIG. 3: Typical commercial product morphology.

This example illustrates the equilibrium $SBC_e$ for a wide range of compositions from Z=0 to Z=0.44. The $SBC_e$ is listed for a typical commercial morphology, which is:
Dense particles with oval to spherical shape (D50 of PSD=8-10 μm),
BET surface area: 0.26-0.6 m²/g,
BET surface area after washing in $H_2O$ and drying: 0.6-0.9 m²/g,
Tap density: 2.0-2.4 g/cm³,
Li:M within crystal structure: optimized for good cycle stability, good capacity and acceptable rate performance. FIG. 3 shows a typical commercial morphology.

In one embodiment the current invention can provide cathode materials with Z=0.36 to 0.5, and having a capacity value of 170 to 185 mAh/g. A typical equilibrium $SBC_e$ increases from 55-100 mmol/g (for Z=0.3, Q=170 mAh/g) to 100-200 mmol/g (for Z=0.5, Q=185 mAh/g). Higher values of Z can practically not be prepared in air (which contains natural $CO_2$) using $Li_2CO_3$ as precursor. Table 2 lists the typical values (upper and lower limit) for the equilibrium $SBC_e$, and the capacity of the materials.

TABLE 2

(with units as in Table 1)

| Ni:Mn:Co or composition | Z | $Q_d$ | Li:M | SBC (low) | SBC (high) |
|---|---|---|---|---|---|
| 1:1:1 | 0 | 155-159 | 1.08-1.12 | 15 | 45 |
| $Ni_{0.37}Mn_{0.30}Co_{0.33}$ | 0.07 | 158-162 | 1.06-1.10 | 20 | 55 |
| 5:3:2 | 0.2 | 166-170 | 1.00-1.04 | 45 | 70 |

TABLE 2-continued (with units as in Table 1)

| Ni:Mn:Co or composition | Z | $Q_d$ | Li:M | SBC (low) | SBC (high) |
|---|---|---|---|---|---|
| $Ni_{0.533}Mn_{0.267}Co_{0.200}$ | 0.267 | 167-171 | 1.00-1.04 | 50 | 85 |
| 6:2:2 | 0.4 | 176-180 | 1.00-1.04 | 90 | 150 |
| $Ni_{0.667}Mn_{0.222}Co_{0.111}$ | 0.444 | 177-181 | 1.00-1.04 | 100 | 180 |

(Z = 0-0.267 are reference examples)

The table lists a low value obtained for larger and dense particles (typical BET 0.25-0.3 m²/g) with a lower Li:M ratio and relatively large crystallites (up to 1 μm), whereas the high value refers to smaller particles with some remaining porosity (typical BET: 0.3-0.6 m²/g) with a higher Li:M ratio and relatively small crystallites. Table 2 also lists a range for the capacity where the lower value is obtained for larger and dense particles.

Figure 4A:
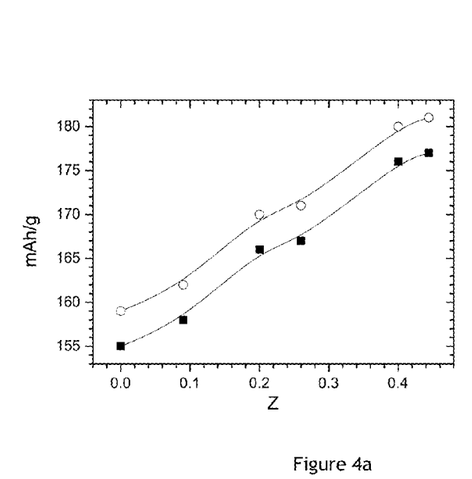
FIG. 4a (left panel): Upper and lower capacity range for "commercial" morphology samples as function of "Z".
Figure 4B:
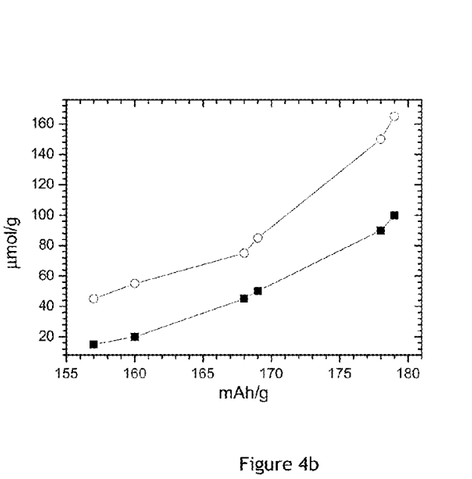
FIG. 4b (right panel): Typical upper and lower value for the equilibrium SBC as a function of capacity.

FIG. 4a (left panel) shows the upper and lower capacity range (mAh/g) for "commercial" morphology samples as a function of "Z", whilst FIG. 4b (right panel) gives the typical upper and lower value for the equilibrium SBC as a function of capacity. The capacity is measured at C/10 rate between 4.3 and 3.0V. In one embodiment of the invention Z ranges from 0.36 to 0.5, corresponding to a capacity of above 170 mAh/g to about 185 mAh/g (measured at C/10 rate between 4.3 and 3.0V. The corresponding upper typical value for the SBC is 100 mmol/g (for 170 mAh/g) and increases to about 200 mmol/g for 185 mAh/g. The corresponding lower value is 55 mmol/g for 170 mAh/g and increases to about 140 mmol/g for 185 mAh/g.

Example 5: Achieving a Low SBC Value by Washing and Reheating

This example demonstrates that a low amount of soluble base can be achieved by a washing and reheating treatment. However, it is shown that as the SBC is decreased below its equilibrium value the cycleability deteriorates dramatically.

A precursor with composition MOOH, M=$Ni_{0.533}Mn_{0.267}Co_{0.200}$ is received from the precipitation pilot plant. The precursor is blended with $Li_2CO_3$ resulting in a 2.5 kg blend. 2 identical samples of each about 2 kg are prepared using a chamber furnace. The air flow rate is 25 L/min. The sinter temperature is 930° C. The sample has a Li:M blend ratio of 1.062. A relatively low sinter temperature and a relatively high Li:M ratio are chosen to achieve a high cycle stability at fast rate. From this precursor a washed sample is prepared, that needs to be dried. Different drying (or reheating) temperatures are tested by reheating the washed sample in air for 5 h. 2 series of final samples are prepared. For the first series reheating is performed at 200 and 400° C. To confirm the cycle stability results the series are repeated at 300, 400 and 500° C.

The samples are investigated by BET surface area measurement, pH titration to obtain the SBC value and by special coin cell testing to investigate the cycle stability at fast rate (1C charge/1C discharge) and high voltage (3.0-4.5V). The high voltage–high rate testing is believed to give representative results for commercial cells. Table 3 summarizes the obtained results. The fade rate is obtained after 53 cycles fast cycling (all cycles at 1C charge/1C discharge, except $1^{st}$ cycle: at C/10) at high voltage (4.5-3.0V), and its value is extrapolated to 100 cycles. The listed value is the average of 2 measurements.

TABLE 3

| Sample | Preparation | BET (m$^2$/g) | SBC (μmol/g) | Fade rate (% per 100 cy) |
|---|---|---|---|---|
| S1 | Sinter @ 930° C. | 0.328 | 85.8 | 21.3 |
| S2 | Wash, reheat 200° C. | 0.832 | 28.90 | 55.97 |
| S3 | Wash, reheat 400° C. | 0.678 | 36.70 | 52.69 |
| S6 | Wash, reheat 300° C. |  | 32.26 | 64.20 |
| S7 | Wash, reheat 400° C. |  | 40.50 | 66.36 |
| S8 | Wash, reheat 500° C. |  | 52.68 | 65.18 |

The equilibrium value $SBC_e$ for sample S1 is relatively high because of 2 reasons. First the relatively high Li:M ratio and second a large inner surface. The large inner surface-manifested by the large BET after wash—takes part in the surface base reactions. It is caused by the relatively low sintering temperature. The pristine sample (without wash) has a lower surface area because parts of the inner porosity are closed by soluble salt like $Li_2SO_4$ which originate from the typical sulfate impurity (about 0.3 mol %) of the MOOH precursor. For the equilibrium value $SBC_e$ the total surface (as measured after wash) and not the pristine BET is relevant.

Figure 5A:
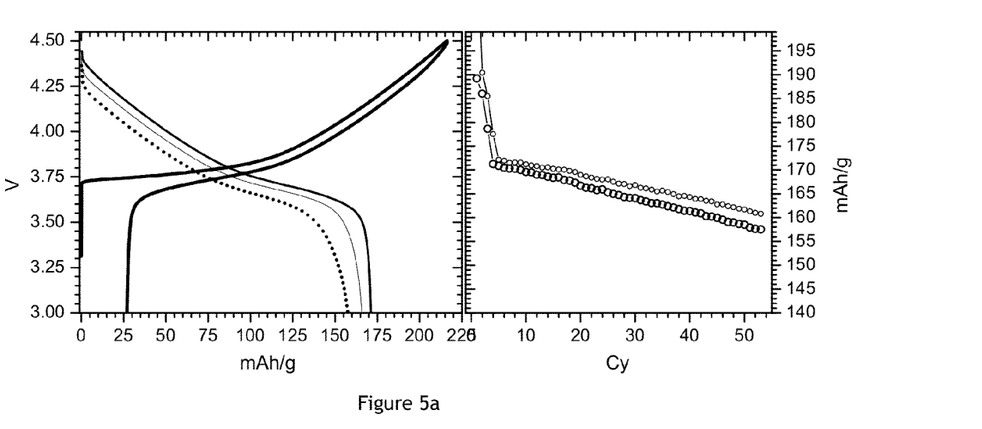
FIG. 5a: Coin cell testing of sample S1 (non washed)
Figure 5B:
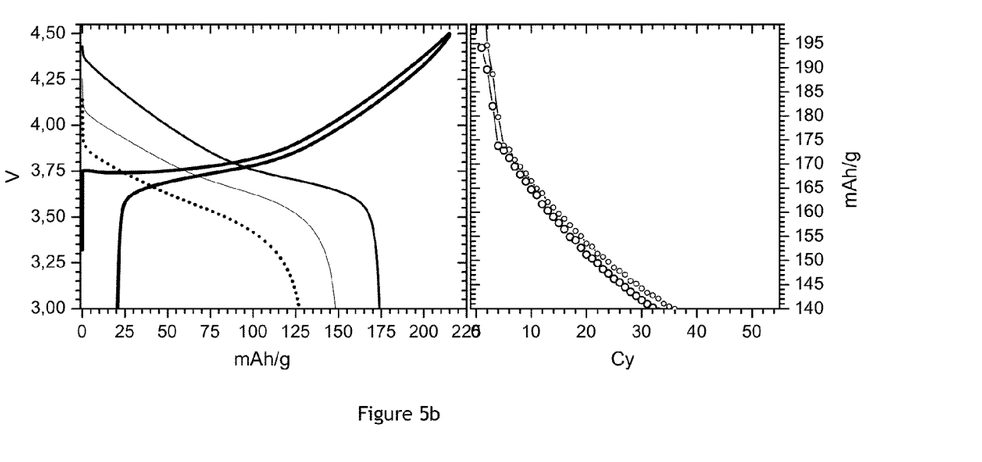
FIG. 5b: Coin cell testing of sample S2 (washed Et dried at 200° C.)

The results of Table 3 show that the base content of Li—Ni—Mn—Co can be drastically reduced by a washing and reheating treatment. Sample S1 has a SBC near to the equilibrium value. However, as the SBC decreases, the cycle stability deteriorates. From several other tests it is confirmed that washed and reheated samples have an inferior cycle stability. These tests include also full cell testing; The inferior stability of washed and reheated cathodes has been confirmed for "real" lithium batteries with near to commercial design. As the washed and reheated samples generally have an SBC much below the equilibrium value, it is believed that an SBC much below the equilibrium is undesired because it causes poor cycle stability at high rate. FIG. 5a shows the coin cell testing results of the sample S1 (non washed), whilst FIG. 5b shows the coin cell testing of the sample S2 (washed Et dried at 200° C.). For both FIG. 5a Et 5b, the left figure shows the charge and discharge curves for the 1$^{st}$ cycle, at C/10 (converging lines at top right at 4.5 V), and 3 discharge curves at cycles 4, 23 and 53, each at 1C. (from right to left). The rate for 1C is 160 mA/g (in 1 hr). The right figure shows the fade: obtained capacity against cycle number (Cy). The small dots are for the charge, the bigger dots for the discharge.

Example 6: Production of High Z Materials with SBC Values Near to the Equilibrium This example illustrates how cathode materials with relatively high Z can be produced at industrial scale. Important preconditions are to (1) supply enough air, (2) use a sufficient long reaction time and (3) use a high enough reaction temperature. Two different mixed transition metal oxyhydroxide precursors with composition MOOH M=$Ni_{0.6}Mn_{0.2}Co_{0.2}$ are obtained from a precipitation pilot plant.

The precursors are mixed with appropriate amounts of $Li_2CO_3$ using a Li:M molar ratio of 1.01 and 1.03. The blend is filled into trays (1.5 kg blend in each tray) which are fed into a tunnel type continuous roller kiln pilot furnace at a rate of 2 trays per 3 hours. The temperature is 880° C., the total dwell time is 25 hours, starting with a 5 h dwell at 700° C. followed by a 20 h dwell at 880° C. Air is continuously pumped into the heating and dwell zone of the furnace at a rate of 6 m$^3$/h. This corresponds to a total air volume of 6 m$^3$/kg blend during heating and dwell. For the chosen conditions the SBC is about 110 μmol/g of cathode. Table 4 lists the obtained results.

TABLE 4 preparation and SBC content of scale-up samples

| | Li:M | Composition M = | SBC μmol/g | BET m$^2$/g | Q (0.1 C) mAh/g |
|---|---|---|---|---|---|
| S6.1 | 1.01 | $Ni_{0.6}Mn_{0.2}Co_{0.2}$ | 105 | 0.262 | 176.27 |
| S6.2 | 1.03 | $Ni_{0.6}Mn_{0.2}Co_{0.2}$ | 115 | 0.222 | 178.04 |

In a large mass production furnace the air flow can be utilized more efficiently, so that it is estimated that about 2 m$^3$/kg of blend and at least 18 hours reaction time (heating+dwell) are needed to complete the reaction.

In a further embodiment the reaction can be split into 2 parts. First the blend is precooked to achieve a poorly reacted $LiMO_2$. Then precooked $LiMO_2$ is sintered. Under these conditions the requirements for air flow and sinter time are slightly lower, it is estimated that at least 1 m$^3$ air and 12 h are needed during the sintering to complete the second reaction. The term "complete the reaction" refers to a cathode product which is free of base impurity second phases (free of unreacted $Li_2CO_3$ and LiOH, and LiOH*$H_2O$ formed during the cooking). Under these conditions the SBC is near to the equilibrium value $SBC_e$.

Figure 6:
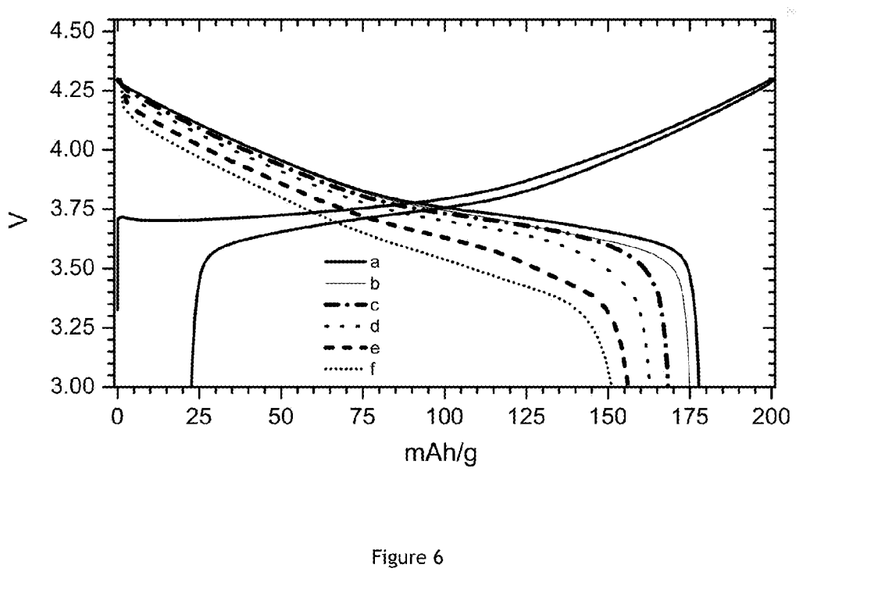
FIG. 6: Electrochemical testing of a $LiMO_2$ sample (56.2) prepared in the pilot plant using (1) a large sintering time (>24 h) and (2) a high air flow (total: 2 $m^3$/kg of blend)

The electrochemical properties of Samples S6.1 z,900 6.2 are tested in coin cells. Performance of both cathode materials is very similar. For sample S6.2, prepared in the pilot plant using (1) a large sinter time of 40 h (>24 h) and (2) a high air flow (total: 2 m$^3$/kg of blend), a reversible capacity (4.3–3.0V) at C/10 rate of 178 mAh/g is achieved. The irreversible capacity (QC−QD)/QC is 11.2%. The rate performance at 2C rate (relative to C/10 rate) is 90.3%. FIG. 6 displays obtained results (voltage against cathode capacity) for different rates going from C/10 to 3C. The first charge and discharge cycle is shown by the lines converging at the top right at 4.3 V: Cy 1 at C/10. The discharge capacities/curves are shown by the lines starting at 4.3 V on the left and ending at 3.00 V. From right to left are shown a: Cy (cycle) 1 (C/10), b: Cy 2 (C/5), c: Cy 3 (C/2), d: Cy 4 (1C), e: Cy 5 (2C), f: Cy 6 (3C). The rate for 1C=160 mA/g.

Example 7: Control of Equilibrium SBC: Research Protocol

This example will demonstrate how it can be checked if the equilibrium SBC has been achieved. A sample S7A is prepared in a continuous pilot plant furnace under given conditions. These conditions refer to the used precursors, the Li:M blend ratio, the airflow, and the dwell time and temperature. As an example: MOOH with M=$Ni_{0.6}Mn_{0.2}Co_{0.2}$, Li:M=1.03, T=700° C. (5 h)→ 890° C. (24 h) using a high air flow. For the material that is obtained (S7A) it can be checked if the equilibrium SBC has been achieved by performing a second cook (test cook). For the test cook a small amount of sample (typically 100 g) is recooked. Comparing the SBC before and after the test cook allows to conclude if the reaction is already finished after the 1st cook, meaning that all the precursor materials have reacted, and hence if the process conditions need to be adapted or not in order to obtain the equilibrium $SBC_e$ in one shot.

The sample obtained after the test cook is called S7B. The reheating occurs in air at a temperature at least 50° C. but not more than 200° C. lower than the sintering temperature. This temperature is high enough to ensure that any remaining base impurity will react and it is low enough so that the morphology does not change significantly during the test cook. Particularly a sintering (growth of primary particles) is undesired. The absence of such growth can be checked by SEM, for example. A typical dwell time is at least 2 hours and can be the same as used for the preparation of the sample. In this example we choose a reheating for 10 h at 790° C. in air. After the test cook the SBC is determined again. If the SBC after test cook is within 10% of the first value then the initial sample has an SBC near to its equilibrium, and the process conditions are considered to be optimal. Table 5 lists the obtained results. A difference in SBC of less than 10% is not significant since the accuracy of the measurement is 5-10%.

TABLE 5

| Sample | Condition | Total base (μmol/g) | SBC-$Li_2CO_3$ (wt %) | SBC-LiOH (wt %) |
|---|---|---|---|---|
| S7A | As prepared | 85.2 (83.5) | 0.100 (0.100) | 0.139 (0.135) |
| S7B | Reheated | 89.88 | 0.0775 | 0.1650 |

The different base contents of S7A are measured again after air exposure of the sample for 1 day in a dry room at 100° C., in order to check their reproducibility (see the values between brackets), which appears to be excellent.

The SBC of sample S7A and S7B are within 10%. Thus the reaction practically is finished after the 1st cook. The different ratio between LiOH and $Li_2CO_3$ type base is related to details of the cooling: sample S7A was cooled in the pilot furnace, whereas sample S7B, after reheating in a box furnace, was cooled in that box furnace.

If the SBC value obtained after the test cook is more than 10% different from the value before the test cook, the equilibrium SBC is considered not achieved, and the conditions for preparing the lithium transition metal oxide powder have to be changed by increasing either one, two or all of the following process properties: reaction time, reaction temperature, effective air flow. An iteration can be started until the conditions have been determined wherein the SBC after test cook is within 10% of the value before the test cook. The value after the test cook can be considered to be the equilibrium $SBC_e$.

The surface specific equilibrium value of SBC for the given composition can be obtained by measuring the BET surface after a wash. The surface specific equilibrium value of $SBC_e$ is then the equilibrium $SBC_e$ (expressed in μmol/g) divided by the surface area (m²/g) after wash. The obtained value (μmol/m²) is, for sufficient high temperature, relatively independent of the morphology. Thus, in first approximation it is a material property, defined by the composition of the material. The BET after wash of sample S7A is 0.615 m²/g. Thus the surface specific equilibrium $SBC_e$ is about 146 μmol/m².

Example 8: SBC as a Material Property

This example demonstrates that the SBC is related to the property of the material to create base if in contact with water, instead of creating a separate impurity phase. If the SBC originates from an impurity phase—for example residual unreacted $Li_2CO_3$ or LiOH, then we expect the following behaviour:
  the SBC should not depend on the stirring time in water,
  if the SBC depends on stirring time (for example when the impurity is in the inside of the particle, being slowly accessible) then carbonate and hydroxide should increase simultaneously, until the impurity phase is dissolved,
  the SBC should not depend on the water to cathode ratio as long as the solubility limit is not reached.

If however the SBC is a surface property, tightly related with the diffusion reaction of lithium involving a few atomic layers (e.g. by ion exchange of Li for protons), as described before, then
  the SBC should increase with stirring time,
  only the LiOH part should increase with stirring time whereas $Li_2CO_3$ remains stable,
  the SBC should increase with water to cathode ratio.

To clarify if SBC originates from an impurity or SBC is a surface property, the following pH titration experiments are performed:
  we use sample S7A of example 7. The sample is $LiMO_2$ with M=$Ni_{0.6}Mn_{0.20}Co_{0.2}$.
  A series of pH titrations where the stirring time (before filtering) is increased to investigate the SBC as function of stirring time. All other parameters (such as sample mass 5 g, water to cathode ratio (100:5), . . . ) are kept constant.
  A series of pH titrations where the sample mass is kept constant but the water to cathode ratio is varied. All other parameters (such as a constant stirring time of 10 min) are kept constant.

Both experiments are repeated after air exposure of the samples for 1 day in dry room at 100° C., giving new figures for the measured SBC values (see the values between brackets in the Tables below). This shows that the reproducibility is very good.

Figure 71:
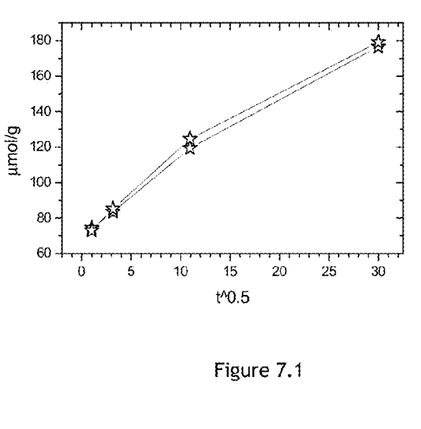
Figure 72:
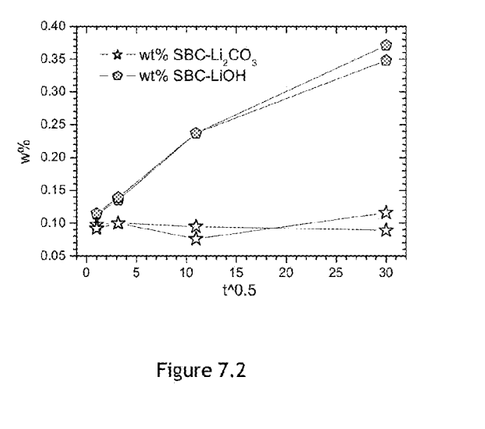

Table 6 and FIGS. 7.1 and 7.2 show the evolution of the different SBC values as a function of stirring time. FIG. 7.1 gives the total base (bottom line: values between brackets), FIG. 7.2 gives the values for SBC-$Li_2CO_3$ (stars) and SBC-LiOH (pentangles), test measurements and repeated measurements are connected by a line.

Figure 8:
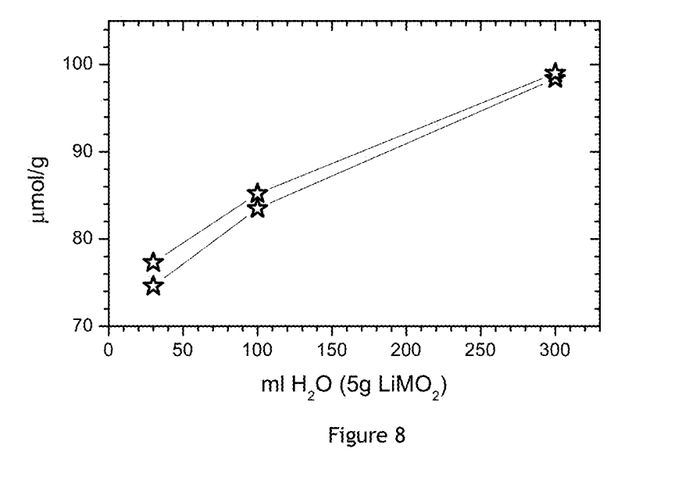
FIG. 8: total SBC as a function of water to cathode mass ratio

Table 7 and FIG. 8 show the evolution of the total SBC as a function of water to cathode mass. The bottom line gives the values between brackets of the repeated experiments in Table 7. The LiOH and $Li_2CO_3$ fractions are obtained using the procedure described in Example 2.

TABLE 6

| Sample | Stirring time | Sq. root of stirring time | Total base (μmol/g) | SBC-$Li_2CO_3$ (wt %) | SBC-LiOH (wt %) |
|---|---|---|---|---|---|
| S8A | 1 min | 1 | 73.0 (74.4) | 0.092 (0.098) | 0.115 (0.114) |
| S8B | 10 min | 3.16 | 85.2 (83.5) | 0.100 (0.100) | 0.139 (0.135) |

TABLE 6-continued

| Sample | Stirring time | Sq. root of stirring time | Total base (μmol/g) | SBC-Li$_2$CO$_3$ (wt %) | SBC-LiOH (wt %) |
|---|---|---|---|---|---|
| S8C | 2 h = 120 min | 10.95 | 124.6 (119.4) | 0.095 (0.076) | 0.237 (0.237) |
| S8D | 15 h (overnight) | 30 | 179.2 (176.6) | 0.089 (0.116) | 0.371 (0.348) |

TABLE 7

| Sample | Water volume | Total base (μmol/g) | SBC-Li$_2$CO$_3$ (wt %) | SBC-LiOH (wt %) |
|---|---|---|---|---|
| S8E | 30 ml | 77.3 (74.6) | 0.100 (0.072) | 0.120 (0.132) |
| S8B | 100 ml | 85.2 (83.5) | 0.100 (0.100) | 0.139 (0.135) |
| S8F | 300 ml | 99.0 (98.4) | 0.134 (0.154) | 0.150 (0.136) |

Table 6 and FIG. 7.2 show that the LiOH type base increases whereas the Li$_2$CO$_3$ type remains roughly stable. The initial increase of LiOH type base follows a square-root of the time (in minutes) dependency, which is typical for diffusion limitation (which is expected for an IX reaction.) The gradual increase of LiOH type base is believed to originate from the ion exchange reaction between protons in water and lithium cations in the upper atomic layers of the cathode.

Table 7 shows the results of varying the water to cathode ratio. The effect of more water is that the Li in solution is more diluted, causing a lower pH. This decreases the Li chemical potential in the solution compared to the Li chemical potential in the bulk. As a result the driving force for the ion exchange reaction increases, this speeds up the IX reaction and also allows that deeper located layers of lithium can take part. We also observe a slight increase of SBC-Li$_2$CO$_3$ with increasing water volume. This might be attributed to some CO$_2$ initially dissolved in the water.

It can be concluded that the pH titration experiments give a strong evidence that the SBC does not originate from separate impurity phases, since in the latter case it could not be explained why the soluble base increases with increasing water volume, and why the total base increases with stirring time but not the SBC-Li$_2$CO$_3$ part.

Example 9: Surface Specific SBC Value

In Examples 3 and 7 the surface specific SBC value was defined as SBC (μmol/g) divided by the BET surface area after wash (m$^2$/g). This example will further explore the idea that the base content is not an impurity but a surface property which is determined by the morphology, expressed by the true surface area, and the cathode materials composition. A sample lithium transition metal cathode materials LiMO$_2$ with M=Ni$_{0.6}$Mn$_{0.2}$Co$_{0.2}$ is prepared from a blend of mixed hydroxide precursor MOOH and Li$_2$CO$_3$ having a Li:M stoichiometric ratio of 1.03. The blend is fired at 890° C. in air for 24 h, using a high flow of air in a pilot plant furnace, and several kg are prepared. The pH titration test shows a SBC of 97 mmol/g. This value is near to the equilibrium value for the given morphology and composition, in line with the results obtained in Ex. 6.

Small material samples (size: about 50 g) are reheated in a chamber furnace using a high air flow rate. Next the BET surface area and the SBC of the treated samples is measured. As the reheating temperature is above the sintering temperature, sintering is expected, and an increase of crystallite size is observed. As a result of the sintering the SBC decreases because the composition does not change but the true surface area decreases. A good measure of the true surface area is the BET surface area obtained from washed and reheated samples. The BET surface area after wash had good reproducibility, it does not strongly depend on the water to solid ratio during washing or the stirring time. The BET after wash is obtained as follows: 7.5 g powder samples are immersed in 70 ml of water and are stirred for 5 min, followed by filtering and drying at 150° C. Table 8 shows the preparation conditions and obtained results.

TABLE 8

| Sample | Preparation | SBC μmol/g | BET before wash m$^2$/g | BET after wash m$^2$/g |
|---|---|---|---|---|
| S9 | 3 kg, 890° C., 24 h | 97.0 | 0.268 | 0.889 |
| S9B | Use S9, 900° C., 5 h | 93.7 | 0.262 | 0.839 |
| S9C | Use S9, 910° C., 5 h | 82.4 | 0.256 | 0.749 |
| S9D | Use S9, 920° C., 5 h | 76.6 | 0.249 | 0.671 |
| S9E | Use S9, 930° C., 5 h | 66.2 | 0.239 | 0.547 |

By the pH titration 100 ml of water are used, and the pH titration is finished when a pH of about 4.5 is reached. Obviously, the measured value will always contain a small contribution due to the response time of the pH electrode and due to the acid needed to achieve pH=4.5 in water. This contribution was measured and is about 0.4-0.7 ml of 0.1M HCl. This value is plotted as additional datapoint (corrected for the 7.5 g sample mass used in the pH titration experiments) in FIG. 9 (black squares), where the SBC values are plotted against the BET before (A) and after wash (B).

Figure 9:
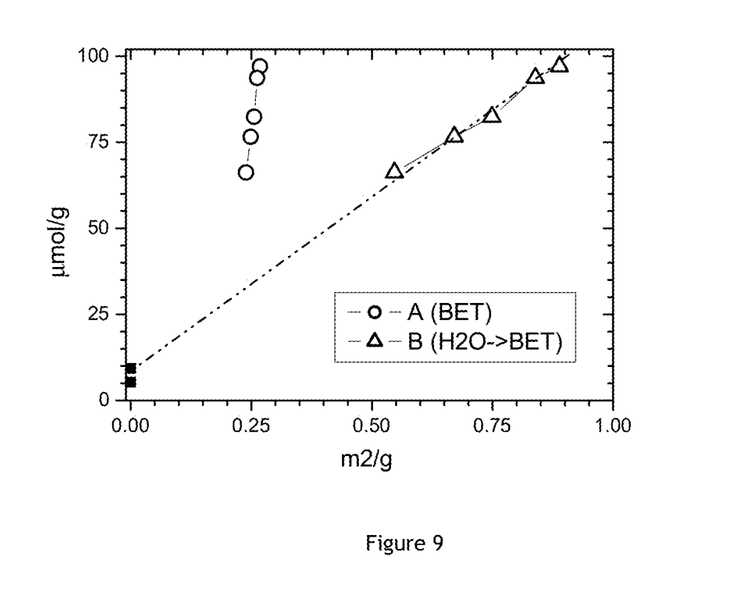
FIG. 9: total SBC as a function of BET surface area before and after wash

We observe that both the BET before and after wash decreases with increasing sintering temperatures. We also observe that the SBC as well as the washed BET decreases by about ⅓ whereas the BET (as prepared) only decreases very little, with about 10%. FIG. 9 shows the relationship between BET surface (as prepared) and (true) BET surface area after wash versus SBC. A linear fit of the data (true BET vs. SBC) will intercepts the Y axis near to zero. The small deviation (less than 15 μmol/g) was discussed above, it is attributed to the acid needed for pure water to achieve the cut-off pH of 4.5. The fit of the BET (as prepared) is very steep and intercepts far away of the origin.

It is expected that the SBC is dependent on the true surface (where ion exchange happens) and the composition of the cathode material. Obviously, plotting SBC as function of BET after wash is confirming this expectation. The data allow to approximate a value for the equilibrium specific base content for a cathode with LiMO$_2$, Li:M=1.03 and M=Ni$_{0.6}$Mn$_{0.2}$Co$_{0.2}$ composition.

The area specific value of SBC is approximated by the slope of the linear fit (dot-dot-dash line) in the graph. It is estimated to be about 100 μmol/m$^2$. As it is not always easy or feasible to do a series of measurements and determine a linear fit, the above shows that we can define the surface specific SBC as: SBC (in μmol/g) divided by the true BET (m$^2$/g) where the BET is obtained after washing and drying.

Using the data in Table 8 yields 110 μmol/m² for sample S9. The values of the specific surface SBC calculated from S9B to S9E are within 10% of this value. The "z" value is 0.44. This specific surface SBC value can be compared with approx. 60 μmol/m² obtained for LiMO₂ with z=0.2: $Ni_{0.5}Mn_{0.3}Co_{0.2}$. The materials according to the invention, for $0.36 \leq z \leq 0.50$, have a specific surface SBC value between approx. 80 and 125 μmol/m².

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

The invention claimed is:

1. A positive electrode material for lithium ion batteries, comprising a lithium transition metal oxide powder, wherein the lithium transition metal oxide powder has a general formula $Li_a((Ni_z(Ni_{1/2}Mn_{1/2})_yCo_x)_{1-k}A_k)_{2-a}O_2$, wherein x+y+z=1, $0.1 \leq x \leq 0.4$, $0.36 \leq z \leq 0.50$, A is a dopant, $0 \leq k \leq 0.1$, and $0.95 \leq a \leq 1.05$, wherein the powder is characterized by a soluble base content SBC obtained at room temperature and a soluble base content SBC-heated obtained upon heating the powder for 5 to 10 hours under air at a temperature ranging from 500° C. to a temperature less than the temperature where the morphology of the powder changes by sintering, whereby the ratio SBC-heated/SBC is less than 110%, and wherein the soluble base content SBC is the sum of the soluble base contents of Li2CO3 type base (SBC-Li2CO3) and LiOH type base (SBC-LiOH), both expressed in wt %, whereby (SBC-Li2CO3)≥0.085wt %.

2. The positive electrode material of claim 1, wherein $0.40 \leq z \leq 0.45$.

3. A positive electrode material for lithium ion batteries, comprising a lithium transition metal oxide powder, wherein the lithium transition metal oxide powder has a general formula $Li_a((Ni_z(Ni_{1/2}, Mn_{1/2})_yCo_x)_{1-k}A_k)_{2-a}O_2$, wherein x+y+z=1, $0.1 \leq x \leq 0.4$, $0.36 \leq z \leq 0.50$, A is a dopant, $0 \leq k \leq 0.1$, and $0.95 \leq a \leq 1.05$, and has a soluble base content (SBC) that increases by less than 10% when the oxide powder is heated for 10 hours under air at a temperature of 790° C. according to claim 1.

4. The positive electrode material for lithium ion batteries, according to claim 1, having a BET surface area between 0.22 and 0.40 m²/g, and having a soluble base content (SBC) between 80 and 120 μmol/g.

5. The positive electrode material of claim 1, wherein (SBC-Li₂CO₃)/(SBC-LiOH)>0.2.

6. The positive electrode material of claim 1, having a surface specific SBC of 80-125μmol/m², wherein the surface specific SBC is the ratio between SBC and BET surface area, wherein the BET surface area is measured after washing and drying.

7. The positive electrode material of claim 1, wherein A is one or more dopants selected from the group consisting of Al, Ti and Mg, and 0<k<0.1.

8. The positive electrode material of claim 1, wherein A is one or more dopants selected from the group consisting of B, Ca, Mn, Cr, V, Fe, Zr, S, F, P and Bi, and $0 < k \leq 0.01$.

9. A method for preparing the positive electrode material LiMO₂ of claim 1, comprising the steps of:
providing a transition metal precursor MOOH prepared from the co-precipitation of transition metal sulphates with a base;
mixing the transition metal precursor with Li₂CO₃ to form a mixture, and
sintering the mixture under a forced flow of air of at least 2 m³/kg mixture, at a temperature T between 800° and 1000° C., for a time t between 12 and 40 hrs, until no CO₂ is produced from the reaction MOOH+ ½Li₂CO₃=>LiMO₂+½CO₂ +½H₂O.

10. The method according to claim 9, wherein the sintering step is performed at a temperature between 850 to 960° C.

11. The method according to claim 9, wherein the transition metal precursor is obtained by co-precipitating transition metal sulphates and NaOH.

12. The method according to claim 9, wherein the transition metal precursor is a mixed hydroxide or oxyhydroxide containing between 0.1 and 1.0 wt % $CO_3^{2-}$.

13. The method according to claim 9, wherein the sintering step is preceded by heating the mixture for at least 5 hrs at a temperature from 650° C. to 800° C., under a forced flow of air of at least 2 m³/kg mixture.

14. A method for preparing the positive electrode material LiMO₂ of claim 1, comprising the steps of:
providing a transition metal precursor MOOH prepared from the co-precipitation of transition metal sulphates with a base;
mixing the transition metal precursor with Li₂CO₃ to form a mixture, and
sintering the mixture following the reaction MOOH+ ½Li₂CO₃=>LiMO₂+½CO₂+½H₂O under a forced flow of air of at least 2 m³/kg mixture, at a temperature T selected between 800° and 1000° C., for a time t between 12 and 40 hrs, whereby at the completion of the time t no more CO₂ is produced.

* * * * *